United States Patent
Araújo

(10) Patent No.: US 7,559,580 B2
(45) Date of Patent: Jul. 14, 2009

(54) SYSTEM FOR FIXING FENDERS IN MOTORCYCLES

(75) Inventor: Pedro Araújo, Carregosa (PT)

(73) Assignee: Polisport-Pedro & Paulo Araujo Plasticos, S.A., Carregosa (PT)

( * ) Notice: Subject to any disclaimer, the term of this patent is extended or adjusted under 35 U.S.C. 154(b) by 0 days.

(21) Appl. No.: 11/598,719

(22) Filed: Nov. 14, 2006

(65) Prior Publication Data

US 2007/0119643 A1 May 31, 2007

(30) Foreign Application Priority Data

Nov. 14, 2005 (PT) .................................. 103383

(51) Int. Cl.
*B62D 25/16* (2006.01)

(52) U.S. Cl. ............ 280/848; 280/847; 280/152.1; 280/153.5

(58) Field of Classification Search .......... 280/152.1, 280/152.2, 153.5, 154, 160.1, 288.4, 852, 280/854, 847, 848; 180/218, 219
See application file for complete search history.

(56) References Cited

U.S. PATENT DOCUMENTS

| | | | | |
|---|---|---|---|---|
| 4,783,110 A | * | 11/1988 | Beukema et al. | ............ 296/37.7 |
| 5,186,274 A | * | 2/1993 | Hegman | ...................... 180/227 |
| 5,950,975 A | * | 9/1999 | Zieske | ...................... 248/291.1 |
| 5,954,354 A | * | 9/1999 | Chung | ...................... 280/152.1 |
| 6,073,948 A | * | 6/2000 | Motojima et al. | ........ 280/152.2 |
| 6,257,362 B1 | * | 7/2001 | Scherbarth | .................. 180/219 |
| 6,331,011 B1 | * | 12/2001 | Feldmann et al. | ........ 280/152.1 |
| D461,150 S | * | 8/2002 | Myers et al. | ............... D12/186 |
| 6,435,462 B2 | * | 8/2002 | Hawes | ...................... 248/299.1 |
| 6,435,533 B1 | * | 8/2002 | Chuang | ................... 280/152.1 |
| 6,457,618 B1 | * | 10/2002 | Hancock et al. | ............. 224/401 |
| 6,651,769 B2 | * | 11/2003 | Laivins et al. | ............... 180/229 |
| D547,255 S | * | 7/2007 | Savage et al. | ............... D12/223 |
| 2005/0062278 A1 | * | 3/2005 | Griffin et al. | ................. 280/847 |
| 2005/0179245 A1 | * | 8/2005 | Hartmann et al. | ........... 280/847 |
| 2006/0108765 A1 | * | 5/2006 | Teich | ......................... 280/157 |

* cited by examiner

*Primary Examiner*—Christopher P Ellis
*Assistant Examiner*—Katy Meyer
(74) *Attorney, Agent, or Firm*—Sughrue Mion, PLLC

(57) ABSTRACT

The present invention concerns a system for fixing fenders in motorcycles. It is essentially characterized in that it comprises applying a key 1, 5 to a specific fixing area of the fender, such key being either interchangeable, so that the holes thereon are made to match the holes in the fender, or able to move along the fixing area. Therefor, it is respectively provided with specific holes that are adapted to each model of motorcycle or with slant openings which, by sliding the key, allow for a coincident location with horizontal openings of the fender's fixing area.

8 Claims, 6 Drawing Sheets

SYSTEM FOR FIXING FENDERS IN MOTORCYCLES

SCOPE OF THE INVENTION

The present invention concerns a system for fixing the front tenders in several kinds of motorcycles. Essentially it is based on the concept of a "universal part" which shall allow an extended or universal fixing.

Motorcycle front fenders are parts that may be made of several materials the shape of which, in an upper side view, describes a buckle arch and, in a cross section view, presents a concave form, which are both placed on the wheels, the object of which is to prevent the driver from getting mud, water, dirt, rocks and other elements likely to be projected in different senses due to the friction caused by the wheels turning.

The front fender of different motorcycles is normally fixed by means of bolts and respective screws onto a supporting element, located at the upper part of the front clevis of the respective vehicle connecting the two front suspension arms, which is generically named "table".

The diameter and location of the holes, of these front fender fixings of motorcycles, vary according to the different marks and, among these very marks, vary according to the several models. In some cases, the diameter and the location of the holes do only vary in millimetres. These differences make it impossible for a user, who has a fender, to fit it into any other mark or model. In order to achieve such purpose he shall have to obtain a supplementary system or drill holes in different locations and optionally with different diameters. Such a procedure has proven to be cumbersome and lengthy, and it may even weaken the part whereon the additional holes are performed.

PRIOR ART

Several systems to fix front fenders are known, most of them based on systems of fixing by mechanical means, more specifically by bolts and respective check-nuts. As previously mentioned, these systems are not provided for all marks and respective models. Therefore, they may not be extensively or even universally applied.

SUMMARY OF THE INVENTION

The present invention concerns a system for the extended or universal fixing of front fenders for different kinds of motorcycles, such as defined in claim 1.

It is essentially characterized in that it uses a key or universal part that shall allow the adjustment of the holes existing in the fender supports with the holes of the very fenders rails.

This system to fix the front fenders of motorcycles, which is the object of the invention, solves all the inconveniences previously referred to, enabling the keeping up with the variations either in location or diameter.

BRIEF DESCRIPTION OF THE DRAWING

The description that follows it based on the attached drawing in which two embodiments are depicted, which, nevertheless, are not at all intended to limit the scope of the invention.

In the said drawings.

DETAILED DESCRIPTION OF THE INVENTION

Figure 1:
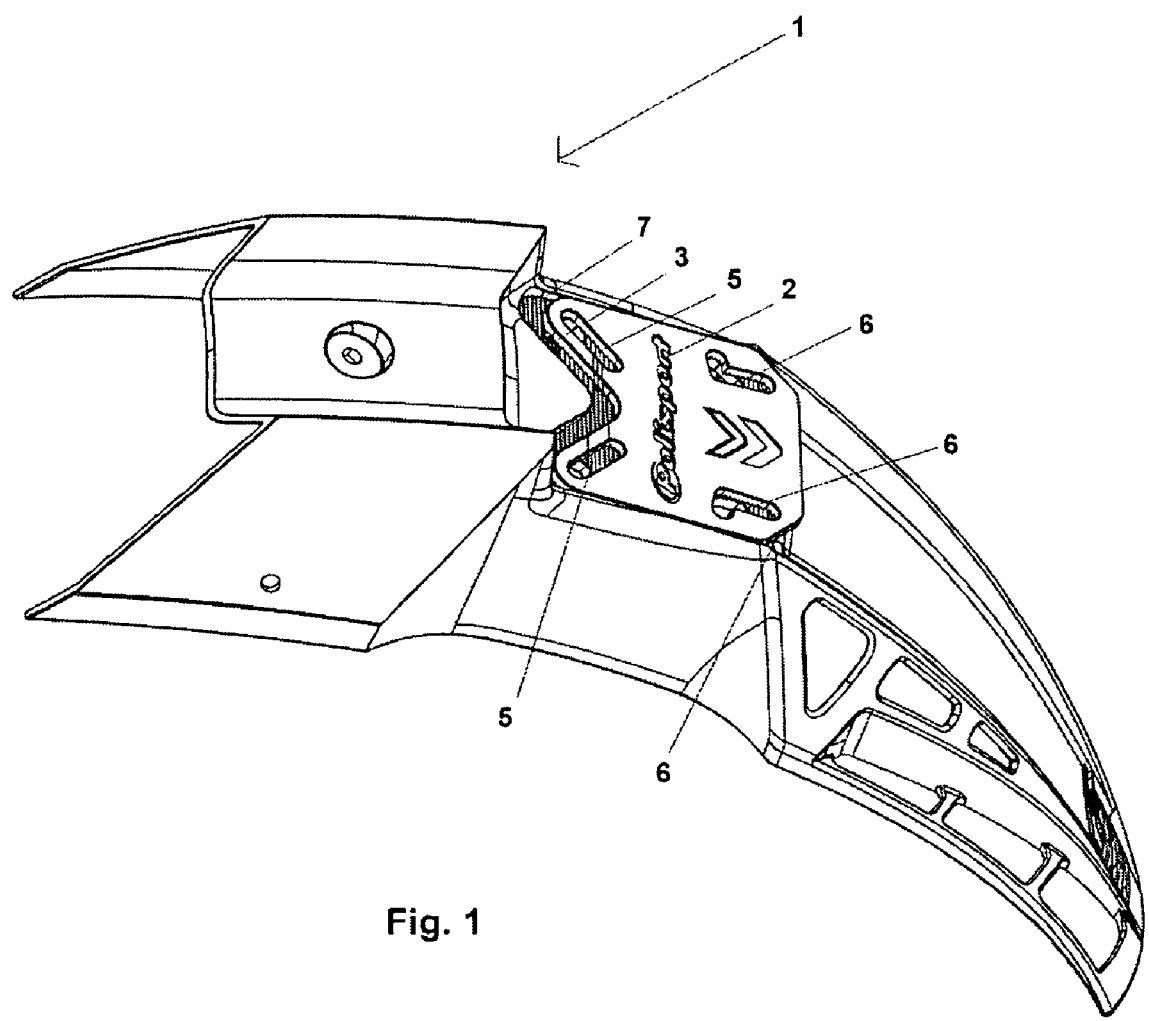
FIG. 1 depicts a perspective view of the front fender of a motorcycle equipped with the universal part that is the object of the invention.
Figure 3:
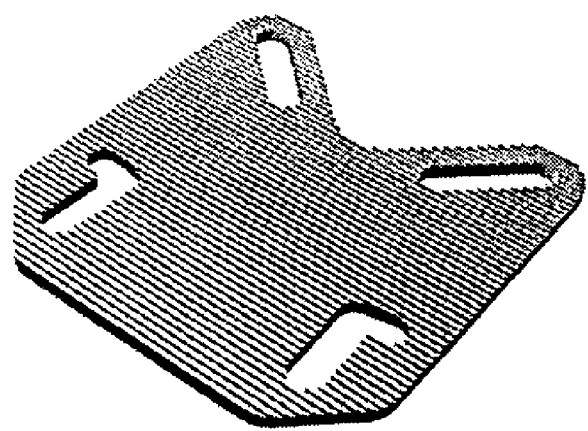
FIG. 3 depicts an under perspective view of the universal part represented in the preceding figure.
Figure 2:
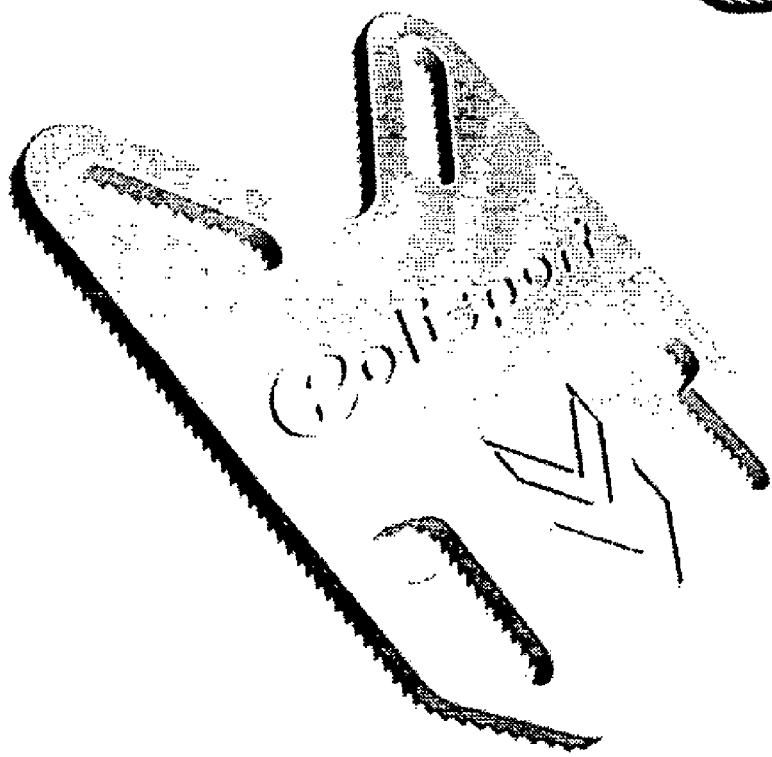
FIG. 2 depicts an upper perspective view of the universal part that is the object of the invention.
Figure 4:
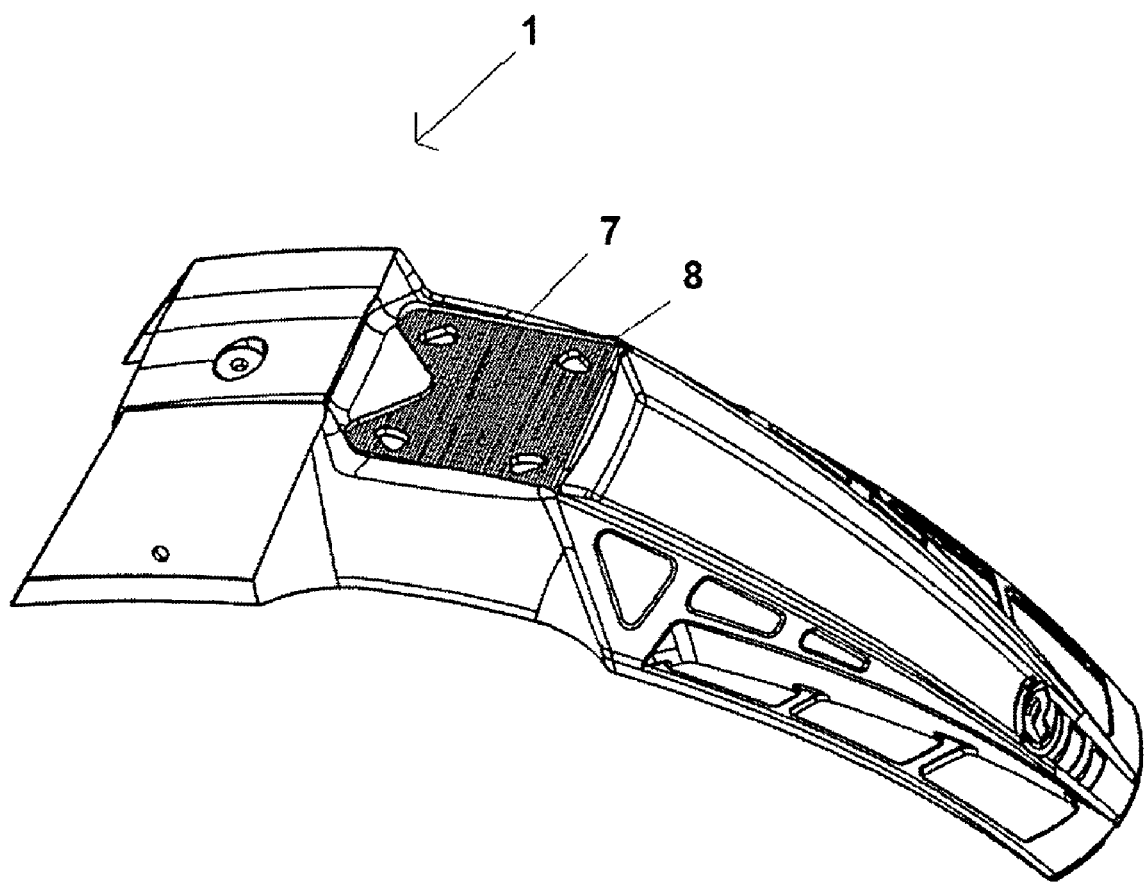
FIG. 4 depicts a perspective view of the front fender without the universal part.
Figure 5:
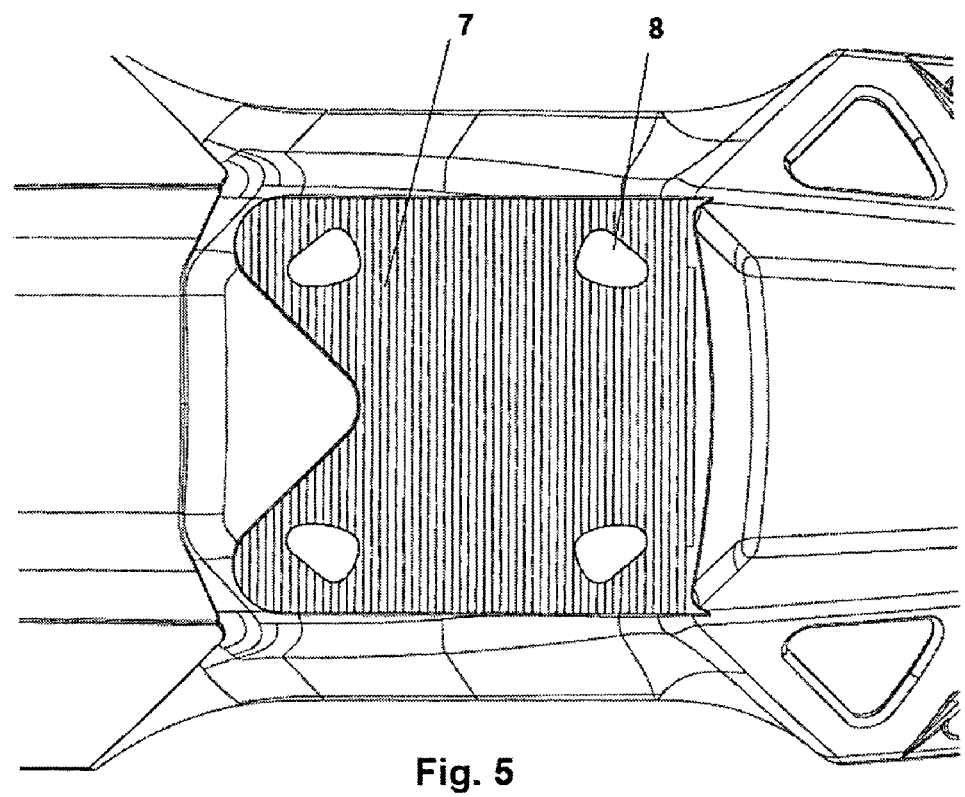
FIG. 5 depicts an upper view of the fender rail on which the universal part is fitted.

As it may be observed by the attached figures, the system to fix a front fender 1 uses a key or universal part 2 which presents a suitable shape, preferably substantially rectangular with an indentation 3 having a "V" shape on one of its shorter sides and the respective side having 4 cut-off corners. Such a part is provided with four openings or slots. Two of the said openings 5 are slant and straight, provided along the edges of the "V" legs. The other two openings 6 are symmetrically provided in the shape of an "L" the shorter flange being slightly inclined outwards and the longer flange being parallel to the longer sides of part 2.

The lower surface of part 2 is dented, being each dent 1.6 mm large, this dimension defining the spacing between each fixing position of part 2.

The portion of fender 1 receiving part 2 presents the shape of a fitting rail 7 which is cut to fit the shape of part 2, in order to suggest the fitting of the said part 2 into a suitable position. To this effect it presents a substantially rectangular shape, also with one of the shorter edges forming a re-entering "V". The whole surface of the rail is dented, which shall allow the part 2 to be fixed precisely in each position chosen. Rail 7 is provided with four openings or slots which present a substantially triangular shape with round corners and are symmetrically arranged respective to the longitudinal axis of rail 7.

As it may be seen from the figures, the adjustment of part 2 in rail 7 of fender 1 after one is duly placed onto the other, which placing is suggested by the shapes of both rail 7 and part 2, is performed by sliding it longitudinally. The dents in rail 7 which receive key 2, together with the dents of part 2, ensure that the fixing is stable. As the denting of part 2 has dents 1.6 mm large it allows for the fixing part 2 to be placed exactly in each new position.

The shape of part 2 and the location and form of openings 5 and 6 and the sliding of this part 2 along rail 7 ensure the perfect coinciding location of the slant openings 5 and 6 and the horizontal openings 8, of respectively the universal part 2 and the dented rail 7 of fender 1.

As it shall be apparent to an expert in the art, this system may be implemented in the lower portion of fender 1, although the fitting thereon may be difficult.

Figure 6:
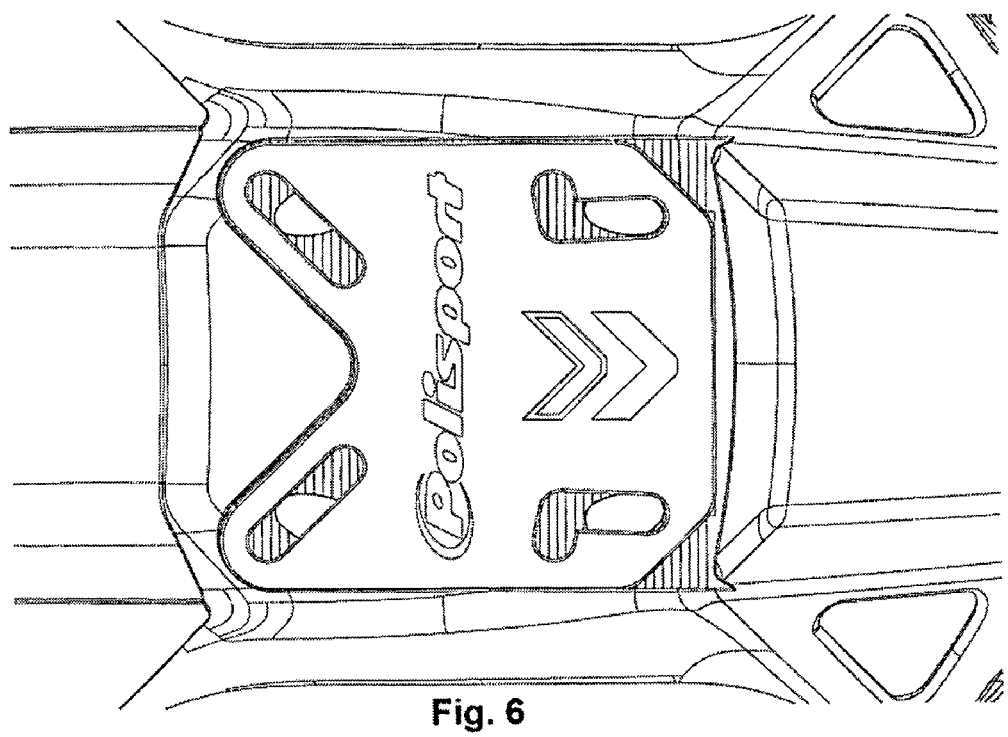
FIGS. 6 and 7 represent similar views to those of FIG. 5 but with the possible fixing positions duly designated.
Figure 7:
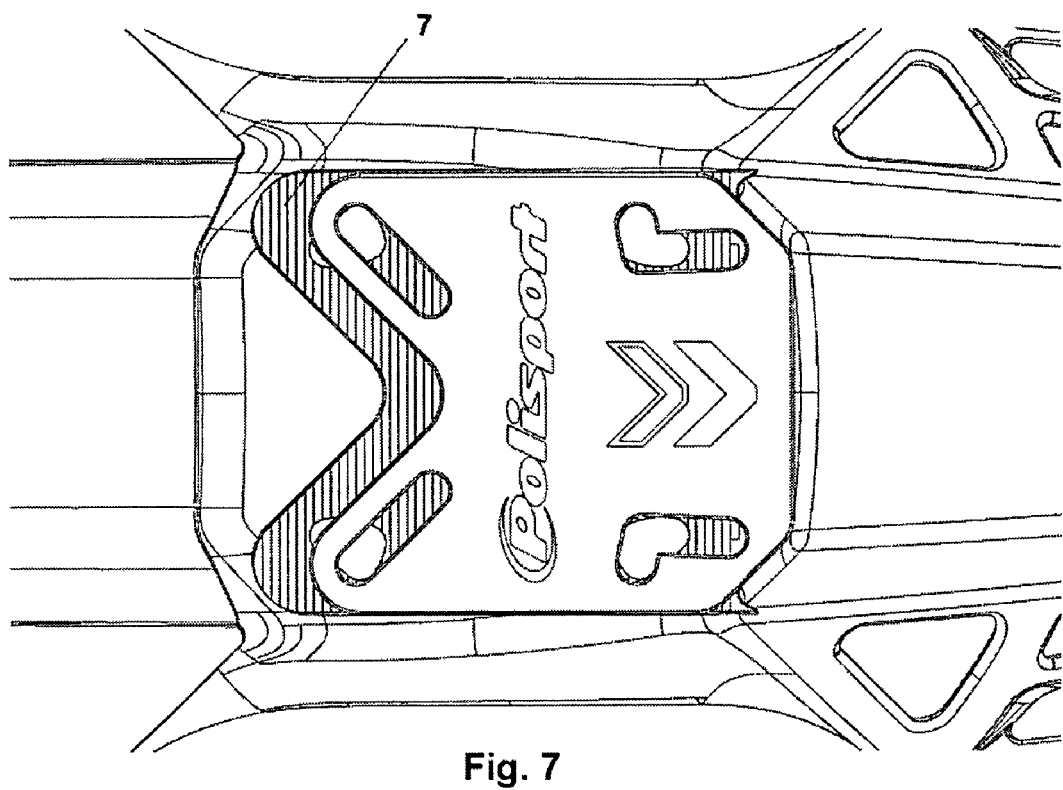

As it may be understood from the preceding description, other fixing positions are possible, in addition to those represented in FIGS. 6 and 7.

The invention claimed is:

1. A system for fixing fenders in motorcycles, comprising:
a motorcycle fender, including a fitting rail provided at a top of the fender and a plurality of openings in the fitting rail; and
a universal part applied on top of the fitting rail of the fender, wherein the universal part includes a plurality of elongated openings, and the universal part is movable along the fitting rail such that locations of the elongated openings of the universal part are coincident with the openings of the fitting rail of the fender, wherein the elongated openings are also aligned with holes of a fender support of a motorcycle.

2. The system for fixing fenders in motorcycles, according to claim 1, wherein the universal part has a substantially rectangular shape with an indentation having a "V" shape in one of the shorter sides thereof, the universal part has four cut-off corners, and the universal part has four openings.

3. The system for fixing fenders in motorcycles, according to claim 2, wherein two of the said openings of the universal part are slanted, straight, and provided along the edges of the "V" shape, and the remaining two openings are symmetrically provided in the shape of an "L" with the shorter flange slightly inclined outwards and the longer flange parallel to the longer sides of the universal part.

4. The system for fixing fenders in motorcycles, according to claim 1, wherein the rail of the fender has a substantially rectangular shape forming a re-entering "V" in one of the shorter sides thereof, the rail being provided with four openings, each of the openings having a substantially triangular shape with rounded corners, and the openings being symmetrically arranged with respect to the longitudinal axis of the rail.

5. The system for fixing fenders in motorcycles, according to one of claims 1 through 4, wherein the sliding of the universal part along the longitudinal axis thereof onto the rail of the fender allows to the openings of universal part to be coincident with the openings of the rail, thereby ensuring a solid fixing of the fender.

6. The system for fixing fenders in motorcycles, according to one of one of claims 1 through 4, wherein both the lower portion of the universal part and the upper surface of the rail comprise dents, thereby ensuring that the universal part is stably fixed to the rail.

7. The system for fixing fenders in motorcycles, according to claim 6, wherein the dents of the universal part comprise dents that are 1.6 mm large, thereby allowing the fixing part to be placed exactly and precisely in each new position.

8. The system for fixing fenders in motorcycles, according to one of claims 1 through 4, wherein the rail provided at a lower portion of the fender.

* * * * *